United States Patent Office 3,313,677
Patented Apr. 11, 1967

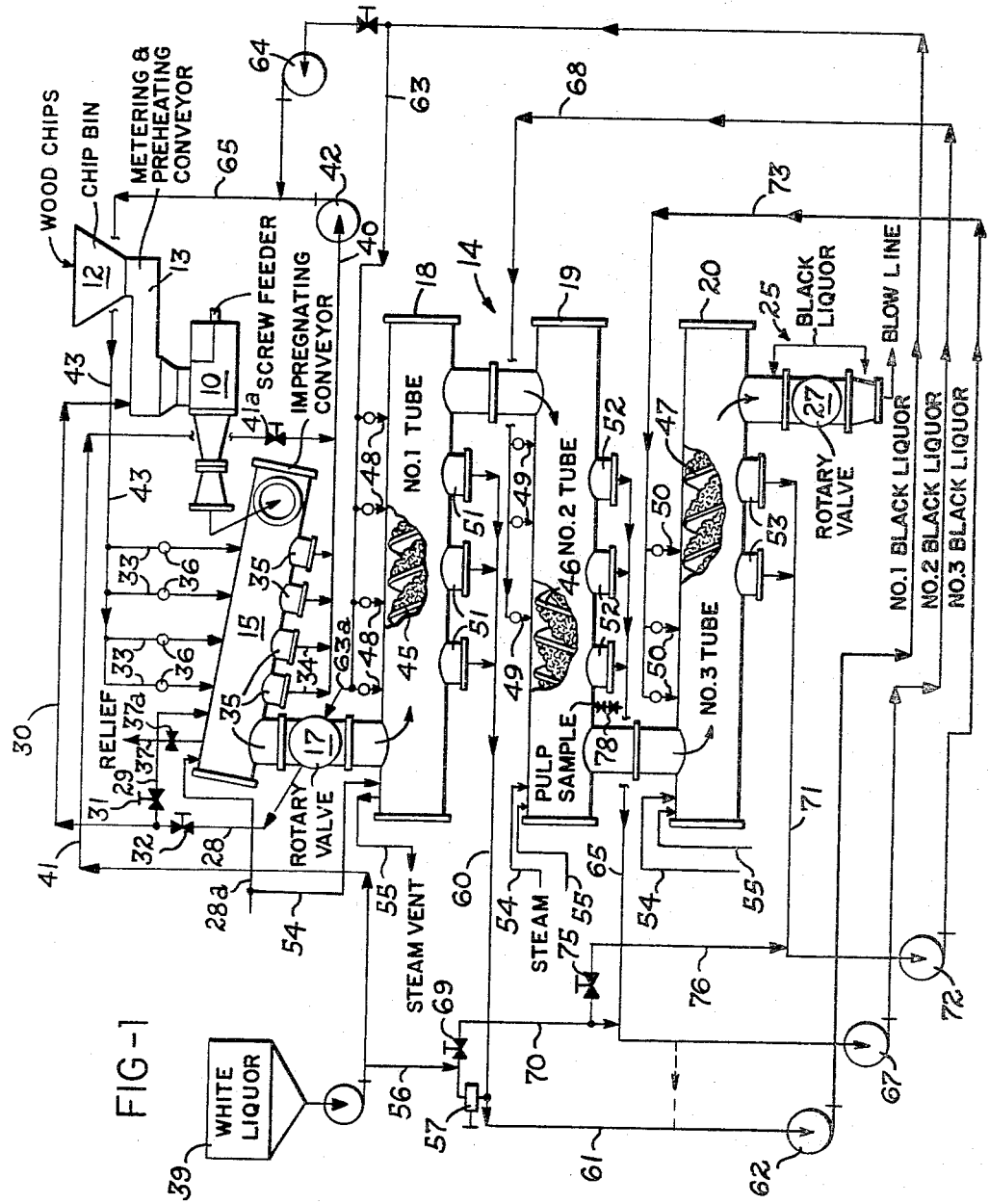

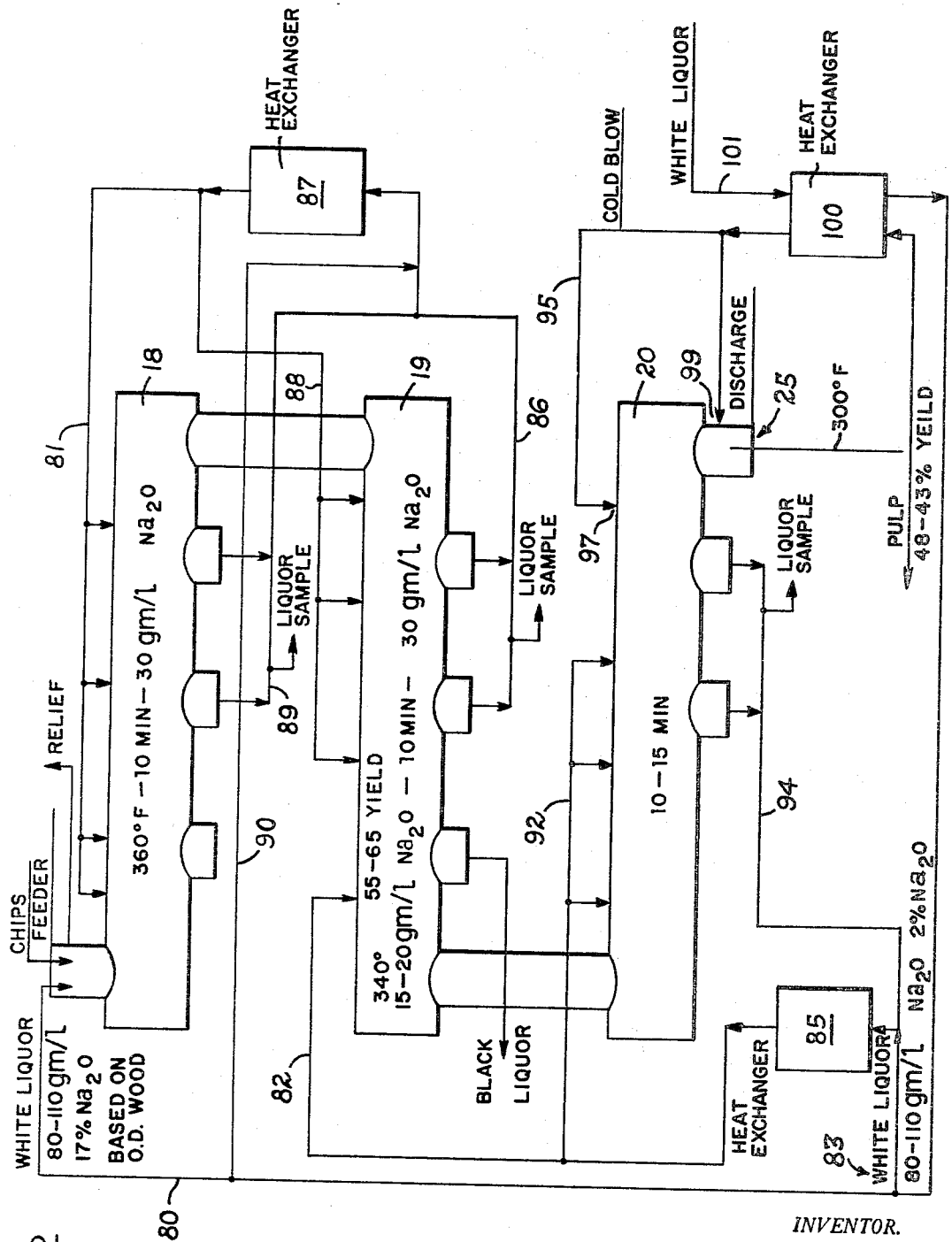

3,313,677
TWO-STAGE CONTINUOUS DIGESTION WITH REMOVAL OF LIQUOR IN FIRST STAGE AND RECIRCULATION OF LIQUOR IN SECOND STAGE
Wayne F. Carr, Hamilton, Ohio, assignor to The Black-Clawson Company, Hamilton, Ohio, a corporation of Ohio
Filed Mar. 30, 1962, Ser. No. 183,785
6 Claims. (Cl. 162—19)

This invention relates to a continuous process for producing high quality, low yield kraft pulp in a minimum of time.

Manufacture of high quality kraft paper depends upon treatment of wood or other cellulosic material, preferably in the form of chips, such that the lignin is separated efficiently from the cellulosic component of the starting product. The stability and quality of high strength or high quality kraft paper depends on the amount of cellulose present and especially cellulose in the form of alpha and/or beta cellulose. The presence of significant amounts of lignin in kraft pulp tends to effect material reduction in the strength and quality of the final paper product, and it is the presence of the lignin in pulp which distinguishes high quality kraft from low quality, high yield kraft pulp.

In the processing of high yield low quality kraft pulp, the chemical concentration is lower, and the processing control required may not be as precise as that needed in the case of high quality kraft in high or low yields. Such differences between low and high quality kraft processing is understandable in view of the fact that high yield low quality kraft contains appreciable amounts of lignin and therefore close control during processing is not necessary since selective removal of lignin is not a prime consideration. In the case of kraft in low and high yields, it is possible to employ batch processing utilizing stationary or rotary batch digesters which are preloaded, and the charge is cooked to provide a pulp of desired quality. Thereafter the digester is loaded with a second charge which is processed to provide a second batch of kraft pulp of desired quality. In the latter system, good results have been obtained insofar as quality and yield are concerned, but considerable time is involved in batch processing due to the fact that the process is not continuous and time may be lost during batch charging operations, and the like.

A further consideration in batch processing is that of quality control. In instances where large quantities of kraft of a particular quality and color characteristics are to be produced, quality control from batch to batch may represent a major consideration depending on the nature of the starting product and uniformity of processing. For example, white spruce contains about 56% cellulose and 27% lignins, while black spruce contains about 50% cellulose and about the same amount of lignin as does white spruce. In the case of jack pine, the cellulose content is about 49% with a lignin content of 30%. Moreover, the cellulose content may vary as much as 4% between different parts of the same tree, and may vary considerably between trees of the same species, as well as trees of the same species cut from the same tract. In addition to the above variations in chemical composition, the length of the fibers may vary among the various species; for example, white spruce fibers average 3.1 millimeters in length, while jack pine fibers average about 3.5 millimeters in length.

The differences in chemical composition between the various species of wood, as well as the differences within each species, necessarily involve variations in processing in order to produce pulp of uniform quality. In the case of batch processing, variations in the average composition of the chip charge may be considerable, and as much as 4 to 7%, thereby necessitating variations in processing between each batch. For high quality kraft in low or high yields, involving selective removal of substantially all of the lignins, close processing control is required. In the case of batch operations for producing high quality kraft, processing control from one batch to the next may involve a considerable amount of relatively intricate and expensive equipment. The situation may arise in batch processing in which the differences in quality and color from one batch to the next are noticeable despite attempts to produce two batches of the same quality.

Continuous processing, on the other hand, facilitates control, and the differences between the pulp first produced and that produced one or two hours later, for example, will be gradual and not as noticeable as may be the case between two different batches in the batch processing technique. Moreover, control of a continuous process is simplified due to the fact that the volume of material being processed at any one point is relatively small as compared to the volume of material being processed at any one point during batch processing, and therefore, sampling and testing of pulp is considerably easier during continuous processing. In this connection, it should be understood that while the volume of material at any one point in a continuous process is less than that at any one point in the batch process, the total amount of pulp produced in a given time by the continuous process, according to the present invention, will exceed the volume of pulp produced from the same given length of time by a batch process, as will be discussed more fully hereinbelow.

In batch processing, relatively low temperatures and pressures are employed during treatment of the cellulosic material and the temperatures and pressures are elevated relatively slowly to the desired temperature and pressure for batch processing. Attempts to provide a continuous process by adopting batch cooking methods including time, chemical and heat cycles, have resulted in relatively large, complicated mechanisms which are difficult to control and expensive to install. Moreover, modifications of such equipment to provide increased temperature or pressure ranges may involve considerable financial expenditure and installation of relatively large items of machinery.

It is a primary object of this invention to provide high quality kraft pulp from wood or other cellulosic material by a continuous process wherein the results obtained are as good as those obtained by batch processing but which requires less time.

This object has been accomplished successfully in accordance with the present invention by a continuous process which employs higher temperatures and pressures, and wherein the temperature and pressure is increased rapidly to the desired temperature and pressure for processing thereby effecting significant reduction in processing time. Moreover, vapor stage cooking or direct contact between the cellulosic material and steam vapor has been intentionally reduced so as to minimize the mechanical working of the chips during cooking by circulating a small volume of liquor through the chips as a shower. The lubricating action of the liquor serves to reduce substantially the friction of chip on chip and chip on cooking vessel, thereby providing a uniform pulp quality. Additionally, the lignin saturated cooking liquors are removed from contact with the undissolved cellulosic components and a fresh supply of cooking liquor is introduced into the system. Such a procedure operates to prevent precipitation of the dissolved lignins and polymerization thereof over the cellulosic component. In this way, a high brightness is achieved in unbleached pulp, and the strength of the pulp is more uniform and generally materially improved.

Another object of this invention is the provision of a process wherein the concentration of chemicals employed during processing is controlled accurately and efficiently so that a maximum of lignin is maintained in solution while a maximum amount of cellulose remains insoluble.

It is another object of this invention to provide a continuous process of the type described wherein the pulp is preimpregnated with the cooking liquor at a first temperature and wherein the subsequent cooking operation is carried out at a temperature higher than the first temperature.

A further object of the present invention is the provision of an improved apparatus for the continuous production of high quality kraft pulp.

A further object of this invention is the provision of a process of the type described wherein the dissolved lignin solids are withdrawn from contact with the cellulose thereby preventing polymerization of the lignin on the cellulose.

A still further object of this invention is the provision of a continuous process wherein cooking or digesting is accomplished in stages over a temperature of 340 to 400° F., and a pressure range of 50 to 235 pounds per square inch, and a liquor concentration of below 60 grams per liter of active alkali expressed as $Na_2O$.

Other objects and advantages of the invention will be apparent from the following description, the accompanying drawings and the appended claims.

In the drawings—

FIG. 1 is a somewhat diagrammatic view illustrating a complete digesting system in accordance with the invention;

FIG. 2 is a somewhat diagrammatic view illustrating the operations carried on during continuous digesting or cooking operation.

Referring to the drawings, which illustrate preferred embodiments of the invention, FIG. 1 illustrates a complete system in accordance with the present invention. The main components include a feeder 10 for chips or or other cellulosic materials to be digested, a chip bin 12, a metering and preheating conveyor 13, and cooking tubes generally indicated at 14. The chips from the screw feeder 10 are fed first to an inclined impregnating conveyor 15 and then through an inlet rotary valve 17 to the plurality of cooking or digesting tubes 18–20, preferably arranged in vertically spaced relation. The cooked material from the last cooking tube is fed to a discharge unit 25 including an outlet rotary valve 27. The individual components in FIG. 1 are each well known and may be of the type disclosed in the United States patents to Beveridge et al. 2,323,194, Kehoe et al. 2,616,802 and Green 2,953,202.

Successful continuous processing of pulp to produce high quality kraft by the alkali or sulfate process involves control of several variables in order to produce substantially pure cellulosic pulp in a minimum of time. The process in accordance with the present invention will be described in two phases for simplicity of explanation. During the first or pretreatment phase, the chips are prepared for the cooking or digesting phase.

To some degree, efficiency of the digesting phase depends upon pretreatment of the chips. It has been discovered that increasing the chip surface area increases the speed of the chemical reaction during digesting resulting in a pulp of more uniform quality. On the other hand, enlarging the chip surface area to extremes will damage the final pulp strength. It is preferred in accordance with the present invention that the chip length be of the order of 1½ inches although it is also possible to employ chips ranging in size from ½ to one inch.

With a uniform chip entering the cooking zone, the resulting pulp shows more uniform characteristics such as color and strength. It is also to be noted that the moisture content of the chip as it enters the cooking zone serves to increase the uniformity of the pulp, and as a general rule, as the moisture content of the chip increases, the rate of delignification increases. Care should be taken during pretreatment to preimpregnate the chip with a chemical prior to reaching the temperature at which cooking will be carried out since this results in pulp of uniform quality. To some extent, preimpregnation of the chips with a dilute alkali is desirable in order to neutralize the woody acids liberated by the high temperatures and pressures employed during the initial phases of the cooking cycle.

During the second phase of processing, that is the cooking or digesting phase, the frictions of chip upon chip as well as chip upon cooking vessel should be minimized in order to reduce any mechanical agitation of the chips which tends to cause a decrease in pulp strength. In the case of cooking or digesting wherein the liquid to oven dry wood ratio is high, as is the case with the continuous process in accordance with this invention, the concentration of active alkali expressed as $Na_2O$ tends to be a controlling factor in pulp quality. Accordingly, the use of alkali which is circulated through the mass of chips tends to increase the cooking reaction while effectively limiting mechanical agitation of the chip mass. It has also been found in accordance with the present invention tion that removal of lignin saturated liquor from contact with the insoluble cellulose component reduces the polymerization of lignin upon the cellulose, and thus operates to increase the quality of the pulp by maintaining the lignin content at predetermined low percentage insufficient to cause any material reduction of pulp strength or quality.

The continuous process of the present invention was designed to incorporate each of the above desired features in a process wherein high quality kraft pulp in low and high yields is produced continuously. As the details of the process unfold, notice should be taken of the deliberate incorporation of each of the above discussed features in a process which efficiently produces high quality kraft pulp continuously.

Referring again to FIG. 1, the chips which are introduced into the chip bin 12 enter a metering and preheating conveyor 13. While present in the preheating conveyor 13, the chips are exposed to steam at atmospheric pressure, which tends to cause softening of the chips, and thus as the chips enter the screw feeder 10, a mild mechanical action on the chips is assured. Exposing the chips to steam, preferably at atmospheric pressure, causes the chips to absorb a high percentage of eater in a uniform manner, thereby providing chips of relatively uniform moisture content for subsequent operations. A convenient source of low pressure steam is the steam from the low pressure side of rotary valve 17, which is fed to the impregnation tube by lines 28 and 29 and fed to the preheating conveyor 13 by conduit 30. Additionally, steam for the impregnation tube is also available from line 28a. Pressure in each of the lines may be controlled by valves such as 31 and 32.

With cellulosic starting materials which have a low density, i.e., soft and hard woods, a preimpregnation step under pressure of about one to fifteen pounds per square inch for a period of about two to twenty minutes is desirable to effect uniform absorption of moisture. This may be accomplished by employing a rotary valve in place of the screw feeder 10, and offers the advantage of substantially eliminating any mechanical agitation or pulp degradation which would be detrimental to pulp strength. In the case of low density soft woods, experience has indicated that it is advantageous to avoid mechanical degradation of the chips in order to prevent subsequent cleavage of the cellulose molecule during treatment with alkali utilized to remove alkali soluble lignins.

High density woods, as a general rule, require temperatures somewhat higher than the low density starting materials, and it is to be understood that this invention is directed to processing of each of the above classes of wood.

The impregnation tube may be employed to treat the chips with a cooking liquor, or pre-steam the chips if no liquor is employed. In some instances, a prehydrolysis of the starting material utilizing water and acid may be desirable, depending on the nature of the cellulosic starting materials employed. Regardless of the exact nature of the conditions taking place during pretreatment, the effect of such an operation is to provide a chip having a substantially uniform moisture content thus assuring a substantially uniform action of the cooking liquor on the chip mass during the digestion phase.

The chips entering the screw feeder 10 from the preheating conveyor are compacted slightly but not to the point at which it becomes detrimental to final pulp strength. At the same time that the chips are compressed slightly, they are split in the grain direction to increase the surface area thereby providing a chip having increased reaction surface. It is preferred to employ a low pressure screw feeder operated in the range of 400 pounds per square inch so as to eliminate substantially any excessive compaction of the chips. In this manner, excessive compaction of the chip tending to interfere with the final pulp strength is avoided. The screw feeder also operates to prevent loss of steam or cooking liquor from the impregnating conveyor 13.

The chips or partially disintegrated chip mass leaving the screw feeder 10 are discharged into the lower end of an impregnating conveyor 13 which includes therein a dilute cooking liquor. As the mass enters the pre-impregnation zone beneath the surface of the liquor bath from the feeder 10, the chips tend to expand slightly, and thus the liquor in the impregnation tube will penetrate into each chip quite rapidly. The tube 15 is arranged to provide a constant liquor level, as by providing an inclined tube, and is provided with means to circulate liquor through the tube including a plurality of liquor inlet conduits 33 and liquor removal condits 34 connected to the extraction pots 35. It is also possible in accordance with this invention to provide a plurality of spray heads for the pre-impregnation treatment as opposed to a constant liquor bath. Each of the inlet conduits 33 includes a metering valve 36 for selective control of liquor flow.

The temperature, pressure, liquor concentration and dwell time during the pre-impregnation treatment are controlled so as to provide a chip of the desired uniform quality for subsequent cooking operations. Satisfactory results have been achieved during pre-impregnation by maintaining the pressure between 0 to 75 pounds per square inch and preferably 50 pounds per square inch, and maintaining the liquor concentration between 0 to 60 grams per liter active alkali expressed as $Na_2O$, depending on the raw material and the desired product. The temperature is maintained below about 300° F. and usually in the range of 212° and 310° F., thus maintaining the temperature during pre-impregnation below that at which cooking is conducted. In this manner, one source of poor quality pulp is substantially eliminated since the chemical impregnant and the chips are not exposed to a temperature higher than that employed during the normal cooking operation. The normal dwell time of the chip mass during pre-impregnation is between 5 seconds and 15 minutes, and experience has indicated that with most starting products a dwell time on the average of two minutes is sufficient to prepare the chips for the continuous cooking or digesting cycle.

It is preferred that the pre-impregnation treatment be carried out on the partially disintegrated chip mass due to the fact that the chips in the mass possess a substantial uniform moisture content and surface area, thereby resulting in a more efficient operation of the dilute alkali in liberating the woody acids. Moreover, removal of the woody acids prior to the digestion phase tends to eliminate any substantial neutralization of the alkali liquor employed during digestion. The presence of large amounts of woody acids during the initial phase of digestion may be sufficient to cause appreciable alteration in the concentration of the alkali liquor resulting in inefficient digestion.

During the pre-impregnation treatment, the chips are advanced through the conveyor 15 by a conventional screw feed assembly driven by a variable speed drive of conventional design. During exposure to the liquor bath in the tube, gases are generated and gases including air are removed, by a relief line 37 controlled by valve 37a located in the higher end of the conveyor above the level of the liquor. Control of the liquor concentration during pre-impregnation is accomplished by supplying liquor of proper concentration from a white liquor storage tank 39 to the return conduit 40 by conduit 41, the latter including valve 41a therein. The concentration or control of the liquor concentration throughout the process may be carried out by employing conductivity meters or other suitable apparatus. The reinforced liquor of proper chemical composition is recirculated through a pump 42 to the inlet conduits 33 by conduit 43. Since the liquor enters the top of the preimpregnation tube 15 and is removed from the bottom, the chips are constantly exposed to a downward flow of liquor, thereby providing uniform exposure to the liquor and minimizing friction of chip on chip as well as friction of chip on the walls of the conveyor.

The chips discharged from the top of the inclined conveyor through the rotary valve 17 enter the first of a series of cooking or digesting tubes 18-20. The rotary valve functions to zone the cooking tubes from the pre-impregnation tube, thereby permitting a pressure and temperature differential between these two components of the systems. The cooking or digesting area includes a plurality of cooking tubes 18-20 preferably in multiples of three, each of which includes a screw feed assembly 45, 46 and 47, respectively, adapted to advance the chips horizontally through the tube. Each of the screw feed assemblies is driven by a conventional variable speed drive, as is well known in the art, so as to enable different dwell times in each of the individual digesting tubes. Moreover, each of the tubes 18-20 is provided with a plurality of injection nozzles 48, 49 and 50, respectively, and a plurality of extraction pots 51, 52 and 53, respectively, for effecting recirculation of the liquor as will be hereinafter described.

Liquor is extracted from the bottom of each digesting tube and recirculated to the top thereto, entering the digester through the plurality of inlet nozzles. It is preferred that each pot and nozzle be constructed such that they may be individually controlled thereby assuring selective control of each tube as well as selective control along the length of any particular tube to assure control of the rate of flow and concentration of liquor at any point during digestion. As in the case of the preimpregnation tube 15, the flow of liquor is downward through the chip mass thereby maintaining uniform flow and subjecting each chip to a continuous bath of uniform liquor concentration. The cooked chips are removed from the last tube by means of a discharge assembly 25 including an outlet rotary valve 27 under conditions which will be described below.

In order to provide accurate control of liquor concentration, temperature and pressure, in each tube, a liquor recirculating system is employed in cooperation with steam inlet lines 54 and steam vent lines 55. The concentration of liquor is controlled by supplying relatively high strength white liquor from a reserve tank 39 through conduit 56 and control valve 57 to the return line 60 which interconnects extraction pots 51 of digester tube 18. This liquor, identified as No. 1 black liquor, is then ported through conduit 61 through pump 62 to conduit 63 which interconnects the injection nozzles 48 of digester tube 18. Liquor in line 63 is also introduced into valve 17 by conduit 63a. A portion of the No. 1 black liquor is ported through pump 64 to conduit 65 and from there to the inlet nozzles 33 of the preimpregnation tube. In similar fashion, the liquor concentration in each stage of cooking is controlled. The details of the cooking cycle will be discussed below in connection with FIG. 2.

Liquor identified as No. 2 black liquor is removed from digester 19 through the extraction pots 52 and is fed to conduit 65, through pump 67 to the injection nozzles 49 through conduit 68. Means including valve 69 and conduit 70 are provided for introducing white liquor of desired concentration into the No. 2 black liquor system in order to vary the strength of the No. 2 black liquor. The recirculation system for No. 3 black liquor includes return line 71 interconnecting the extraction pots 53 of tube 20, pump 72 and feed line 73 for the injection nozzles 50. As in the case of digester 19, means including valve 75 and conduit 76 are provided for varying the concentration of the No. 3 black liquor. Means may be provided for sampling the pulp at various points, as for example, sampling station 78.

As has been stated above, the success of a continuous digesting system in removing lignins and producing high quality pulp is primarily accomplished by selective removal of lignins which tend to become soluble upon exposure to an alkali. It has been determined that lignin removal takes place in two phases, the first including the formation of an alkali insoluble lignin, and the second involving the formation of a soluble lignin. This reaction is affected by a number of variables; for example, there is a definite relation between the amount of lignin removed and the length of cooking for a given concentration of active alkali. As a general rule, the higher the temperature during the cooking reaction, the lower the concentration of active alkali expressed as $Na_2O$ required for lignin removal.

The efficiency of selective lignin removal may be understood with reference to FIG. 2 which illustrates in schematic fashion, the operations carried on during continuous digesting. Generally, it is preferred to maintain the temperature between 300 and 400° F., while equivalent pressures are employed, that is, between 50 and 235 pounds per square inch, with liquor concentration varying from 5 to 90 grams per liter of active alkali expressed as $Na_2O$. It is preferred that the temperature be in the range of 340° to 360° F. and the pressure about 100 to 140 pounds per square inch.

The chips from the preimpregnation tube are introduced into digesting tube 18 along with some white liquor having a concentration of 80–110 grams per liter and some recirculated liquor to provide an average liquor concentration of about 30 grams per liter of active alkali expressed as $Na_2O$ so as to assure adequate mixing thereof. Although the white liquor is shown as being introduced by a separate conduit 80, it is understood that conduit 80 could be arranged to mix the white liquor with the recirculated liquor in conduit 81 so that a liquor having a concentration of about 15 to 30 grams per liter is introduced into digester tube 18. Referring to FIG. 1, this may be accomplished by conduit 56 which interconnects the white liquor source 39 to the line 60 from the extraction pots 51. The pressure is preferably maintained at about 150 pounds per square inch for an equivalent temperature of about 365° F. For most raw materials, a dwell time of about ten minutes in this tube is sufficient as a preliminary cooking phase, and the dwell time may be decreased or increased as needed by adjusting the speed of the variable drive mechanism in a manner well known in the art.

It should be noted that the temperature of the chip mass has been elevated from ambient temperature to about 365° F., while the pressure has been increased from ambient pressure sto about 150 pounds per square inch, both increases taking place in preferably three to eighteen minutes, depending on the dwell times during preimpregnation and treatment in the first digesting tube. The rate of increase in temperature and pressure is materially greater than that heretofore considered desirable or practical when compared to bath processing of high quality kraft or continuous procesing of low quality kraft.

The digestion of chips is carried out in phases, it being understood that a plurality of digester tubes may be employed in each phase. In accordance with the present invention, the first phase of digestion terminates as the yield of pulp reaches between 55% and 65% and preferably around 60%, at which point in the processing of the pulp, the content of lignins in the liquor increases and reaches a point wherein the liquor is lignin saturated, so to speak. At this point, it has been found that selective removal of lignins may be accomplished efficiently by removing the lignin saturated liquors and employing a liquor with relatively low lignin content which is sprayed on the chips and maintaining the liquor to oven dry (O.D.) wood ratios in the order of 5:1 at each tube and within substantially the entire area of each tube. In the system shown in FIG. 2, the first cooking phase is completed in the second digester tube 19, wherein the liquor concentration is approximately 15 to 30 grams per liter of active alkali expressed as $Na_2O$ and the temperature is about 340° F. with an equivalent pressure in the order of 100–110 pounds per square inch. It has been found that a dwell time of about ten minutes is sufficient to complete the last stage of the first cooking phase in order to achieve a pulp yield of about 55% to 65%.

Means are provided for supplying liquor of the proper concentration to the digester tube 19 including a conduit 82 which carries a relatively concentrated liquor from the white liquor supply generally designated 83 through a heat exchanger 85 which operates as an indirect heating means. If direct heating is employed, i.e., steam, rotary valves are employed between the tubes to zone each of the tubes thereby permitting pressure and temperature differentials as required. Recirculation of liquor in the digester 19 is accomplished by removing the liquor through conduit 86 connected to the extraction pots, passing it through a heat exchanger 87 to conduit 88. Extracted liquor from digester 18 is removed by conduit 89 which feeds into the heat exchanger 87. A portion of the liquor leaving heat exchanger 87 is ported to conduit 81 connected to the injection nozzles of digester 18, and the remaining portion of the liquor is fed to conduit 88 connected to the injection nozzle of digester 19. White liquor is supplied from conduit 90 to conduits 88 and 86 prior to entry into exchanger 87 for controlling the concentration of the liquor.

During the second phase of the cooking or digesting operation, wherein selective removal of the remaining insoluble lignin component is accomplished, a new liquor is supplied from a recirculation source separate from that employed during the first cooking phase. The liquor employed in the second phase has a lower lignin content and thus a lower concentration of active alkali expressed as $Na_2O$ may be employed. Further, by employing a liquor of lower lignin content, polymerization of lignin upon the cellulose is avoided, and by employing a liquor of relatively low concentration of active alkali expressed as $Na_2O$ there is a tendency to eliminate, to a great degree, any solubilizing of the cellulose components. During this last phase of cooking, it is preferred to employ a liquor concentraiton of about 10 to 15 grams per liter and a temperature in the order of 340° F. with an equivalent pressure of approximately 100–110 pounds per square inch. Under these conditions, a dwell time of about ten minutes is sufficient for most starting materials. During the second phase cooking, other cooking chemicals, for example NaOH and $Na_2S$ may be employed to buffer the reaction mixture and increase the more selective removal of the remaining insoluble lignins.

The final phase of cooking takes place in the third digester 20 which receives the mass of material from digester 19 and progressively advances it to the discharge unit 25. A separate liquor system is provided such that liquor of desired concentration is ported from the heat exchanger 85 to conduit 92 and from there to the injection nozzles of digester 20. Liquor is removed through the extraction pots and fed to the heat exchanger 85 through a conduit 94.

One aspect of the present invention relates to the control of pulp discharge conditions such that the chemical reaction between the cellulosic material is stopped precisely at the desired moment in accordance with the desired characteristics of the pulp. Such control of the chemical reaction may be accomplished in accordance with the present invention by cold blowing the pulp in order to halt any further chemical reaction between the cooking liquor and the pulp mass. Cold blow may be accomplished by rapidly cooling the pulp mass as it reaches the last zone to a temperature of 300° F. or less, if the cooking liquor in the mass zone is of relatively high strength. Since chemicla reaction during the last phase is a function of liquor concentration, it is also possible to effect cold blowing by introducing a liquor of relatively dilute concentration without materially reducing the temperature of the pulp mass in order to create conditions such that the chemical reaction between the chips and the liquor is substantially halted.

Means including conduit 95 are provided to spray the chip mass with liquor at a sufficiently low temperature or concentration to provide cold blowing or controlling the conditions which affect the chemical reaction. The liquor may be introduced into the digester 20 at a point 97 where the chips are about ready to be discharged into the rotary valve 27, and if desired, liquor of relatively low temperature may be introduced on the pressure side 99 of the rotary valve 27 to insure efficient and rapid reduction of the temperature of the chip mass. It has been determined that cold blowing the pulp tends to be beneficial in preserving pulp strength, which is not the case with high yield, low quality kraft. As in the case of the pre-impregnation tube 15 and digester tubes 18 and 19, the liquor is flowed downward through the chip mass and extracted from the bottom end of the tube 20 so as to minimize friction of chip upon chip, and chip upon the cooking vessel.

Although the downward flow of the liquor is beneficial in assuring a mild mechanical working of the chips, it is also desirable to have liquor move transversely of the direction of movement of the chip mass in a generally horizontal direction in each digester tube. It is also desirable to have a relatively large amount of liquor present with respect to the chip mass. To this end, the flow rate is controlled between one and six parts of liquor per part of oven dry wood per minute for each of the tubes, and it is preferred that the flow rate be between two and four parts liquor per part of oven dry wood per minute per tube.

Means including a heat exchanger 100 which receives white liquor from a suitable source 101 are provided so that liquor of proper concentration is employed in order to prevent deposition of the lignin on the cellulose or any of the other undesirable reactions mentioned above. Each of the heat exchangers 85, 87 and 100 is designed such that the liquor temperature is about 180° F. as it leaves the heat exchanger. Each exchanger is of conventional design as is well known in the art.

Many variations are possible in the above process, as will be apparent from this disclosure. For example, the temperature range may be from 200° to 400° F., and liquor concentrations may be as high as 90 grams per liter of active alkali expressed as $Na_2O$ during the first phase of cooking, with a second phase concentration from about 5 to 30 grams per liter of active alkali expressed as $Na_2O$. Moreover, the first phase of cooking or digesting may end when the pulp yield is approximately 45% to 70%. By eliminating the pretreatment sequences, the pulps produced may exhibit characteristics similar to those of high alpha grade kraft.

The processes above described will generally produce pulps of high yields for the same K number, that is, as determined by the TAPPI potassium permanganate test indicative of the amount of unbleached lignins present in the pulp, and the pulps produced in accordance with this process exhibit less fiber degradation. Moreover, the pulp possesses a higher brightness for a given yield, which is a very desirable quality.

In accordance with the above processes, relatively good yields of high quality kraft have been made possible, and as a typical example of the time involved in continuous processing, pulp may be produced in the order of 15 to 35 minutes as measured from the time the pulp passes the inlet rotary valve and is expelled from the outlet rotary valve. In many instances, yields of high quality kraft in the order of 40% and usually about 43% to 48% are possible, depending on the nature of the starting product.

It is to be understood that during processing of the pulp not only are the lignin materials removed, but also the reaction products of lignin and alkali materials as well as lignin derivatives. The alkali material utilized during processing may be any of the well known chemicals as long as they are employed in the proper concentration in order to provide a concentration equivalent to the concentrations previously discussed herein and set forth in terms of grams per liter of active alkali expressed as $Na_2O$.

While the methods and forms of apparatus herein described constitute preferred embodiments of the invention, it is to be understood that the invention is not limited to these precise mehods and forms of apparatus, and that changes may be made therein without departing from the scope of the invention which is defined in the appended claims.

What is claimed is:

1. A two-stage continuous process for producing relatively high quality kraft pulp from a cellulosic starting material in the form of chips having alkali-soluble lignin component and a cellulose component comprising the steps of first digesting said chips in a first alkali cooking liquor for a period of time sufficient to form a partially cooked chip mass in which a predetermined portion of the alkali-soluble lignin component of said chip mass is dissolved resulting in a substantial increase in the dissolved lignin contained in said first cooking liquor, continuously advancing said chips in a generally horizontal path while maintaining an elevated temperature and equivalent pressure and providing a vapor phase above said cooking liquor, recirculating said first cooking liquor through said chip mass during said first digesting step to maintain the concentration of said first cooking liquor substantially uniform, removing a substantial portion of said first cooking liquor and the dissolved lignin from said partially cooked chip mass, further digesting said partially cooked chip mass with a second alkali cooking liquor having a relatively low concentration of dissolved lignin therein, continuously advancing said partially cooked chip mass in a horizontal path through said second alkali cooking liquor while maintaining a vapor phase above said second cooking liquor, recirculating said second cooking liquor through said partially cooked chip mass during said further digesting step to maintain the concentration of said second cooking liquor substantially uniform, completing the digesting operation with said second alkali cooking liquor to remove a portion of undissolved lignin remaining in said partially cooked chip mass, and maintaining the concentration of dissolved lignin during said further digesting below the level at which dissolved lignin will polymerize on said undissolved cellulose.

2. The process as set forth in claim 1 including the steps of pre-impregnating said chips with a liquid material prior to said digesting operation to provide a chip mass of substantially uniform moisture content for the digesting opertaion, and removing said digested material from said second alkali cooking liquor while controlling the temperature and lignin concentration to prevent further substantial reaction between said chip mass and said second alkali cooking liquor.

3. The process as set forth in claim 1 wherein said first cooking liquor has a concentration of between 15 to 90 grams per liter of active alkali expressed as $Na_2O$, and said second cooking liquor has a lower concentration than said first and in the range of 5 to 90 grams per liter of active alkali expressed as $Na_2O$.

4. A process as set forth in claim 1 wherein said cooking liquors are recirculated through said chip mass at a rate of between one and six parts of liquor per part of oven dry wood per minute.

5. The process as set forth in claim 1 wherein said first digesting step is conducted for a period of time sufficient to provide a pulp yield of about 45% to 70%.

6. The process as set forth in claim 1 wherein said cooking liquors are circulated downwardly through said horizontally moving chip mass during said recirculation operations.

References Cited by the Examiner

UNITED STATES PATENTS

| | | | |
|---|---|---|---|
| 2,474,862 | 7/1949 | Richter | 162—18 |
| 2,599,572 | 6/1952 | Miller | 162—61 |
| 2,675,311 | 4/1954 | Natwick | 162—237 X |
| 2,905,240 | 9/1959 | Sandberg | 162—18 X |
| 2,920,697 | 1/1960 | Langen | 162—237 |
| 2,962,412 | 11/1960 | Richardson | 162—61 |
| 2,963,086 | 12/1960 | Green | 12—17 X |
| 2,963,086 | 12/1960 | Green | 162—17 X |
| 2,996,422 | 8/1961 | Durant | 162—19 |
| 3,007,839 | 11/1961 | Richter | 162—17 |
| 3,034,576 | 5/1962 | Putnam | 162—237 |
| 3,097,987 | 7/1963 | Sloman | 162—19 |

DONALL H. SYLVESTER, *Primary Examiner.*

MORRIS O. WOLK, HOWARD R. CAINE,
*Examiners.*